United States Patent [19]

Hart

[11] Patent Number: 4,719,446
[45] Date of Patent: Jan. 12, 1988

[54] REMOTE CONTROL FOR COMBINED CEILING FAN AND LIGHT FIXTURE

[75] Inventor: Edward F. Hart, Yorba Linda, Calif.

[73] Assignee: Casablanca Fan Company, Inc., City of Industry, Calif.

[21] Appl. No.: 607,952

[22] Filed: May 7, 1984

[51] Int. Cl.⁴ .......................................... H04M 11/04
[52] U.S. Cl. ............................... 340/310 A; 98/40.07; 307/630
[58] Field of Search ............ 340/310 A, 310 R, 384 E, 340/825.69; 307/41, 252 B; 98/40 DL, 40.05, 40.07; 417/572

[56] References Cited

U.S. PATENT DOCUMENTS

| | | | |
|---|---|---|---|
| 3,896,355 | 7/1975 | Guicheteau | 307/252 B |
| 4,155,015 | 5/1979 | Nakasone et al. | 307/252 B |
| 4,322,632 | 3/1982 | Hart et al. | 307/252 B |
| 4,329,678 | 5/1982 | Hatfield | 340/310 A |
| 4,350,903 | 9/1982 | Jimerson et al. | 307/252 B |
| 4,367,455 | 1/1983 | Fried | 340/310 A |
| 4,386,340 | 5/1983 | Satoh | 340/384 E |
| 4,418,333 | 11/1983 | Schwarzbach et al. | 340/310A |
| 4,538,973 | 9/1985 | Angott et al. | 417/572 |

Primary Examiner—Robert L. Griffin
Assistant Examiner—Curtis Kuntz
Attorney, Agent, or Firm—Charles H. Schwartz; Ellsworth R. Roston

[57] ABSTRACT

A remote control system for a combined ceiling fan and light fixture for use with existing AC current house wiring between a wall switch and a ceiling fixture including a wall control for electrical substitution of the wall switch and with the wall control including at least two separate control members for producing separate signals on the existing AC current house wiring representing a separate control for the speed of the fan and the light intensity of the light, a control unit mounted on and electrically interconnected with the combined ceiling fan and light fixture and with the control unit electrically connected to AC current house wiring at the ceiling fixture when the combined ceiling fan and light fixture is mounted on the ceiling fixture, the control unit detecting the separate signals on the existing AC current house wiring in accordance with the activation of the separate control members at the wall control, the control unit additionally including a fan speed control and a light intensity control each responsive to one of the detected separate signals to produce an individual control of the speed of the motor and the intensity of the light in accordance with the individual actuation of the separate control members at the wall control.

27 Claims, 11 Drawing Figures

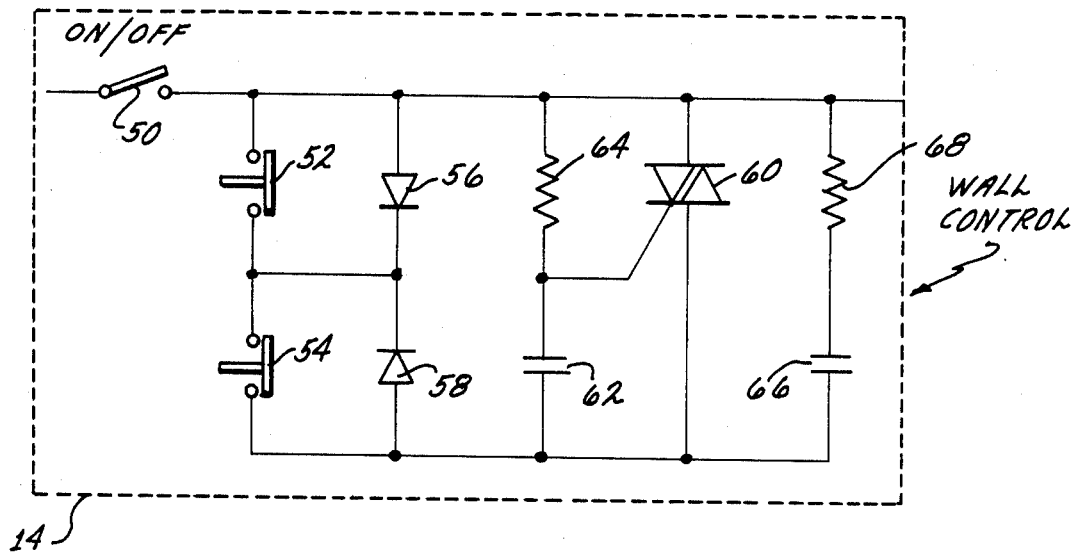
FIG. 2
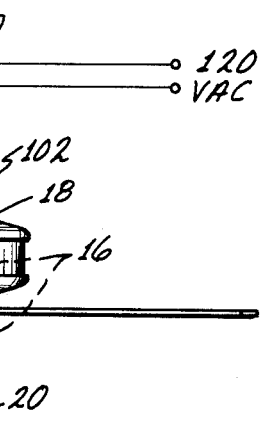
FIG. 6
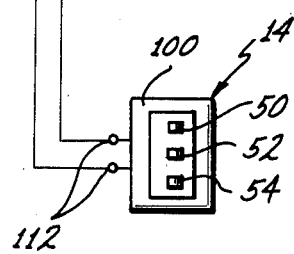

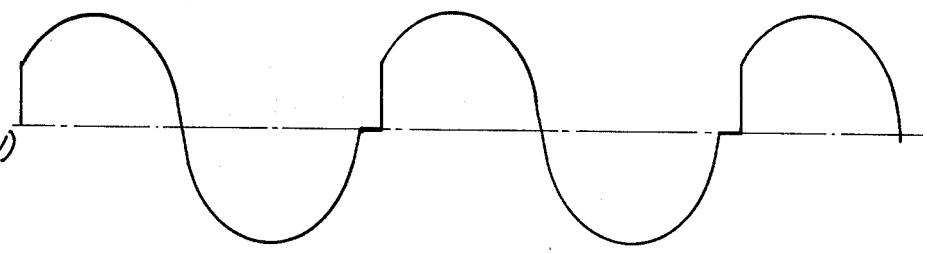
FIG. 4A
(SWITCH 52 OPEN)
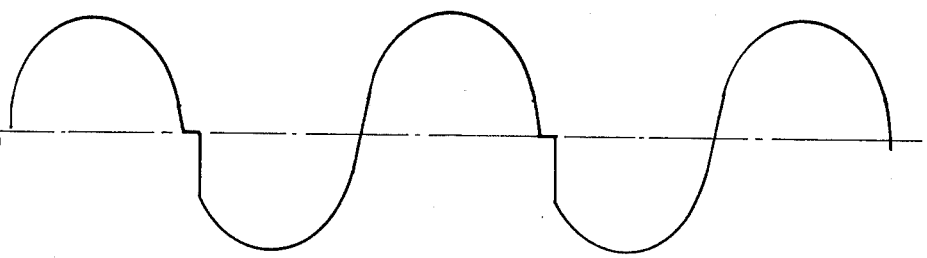
FIG. 4B
(SWITCH 54 OPEN)
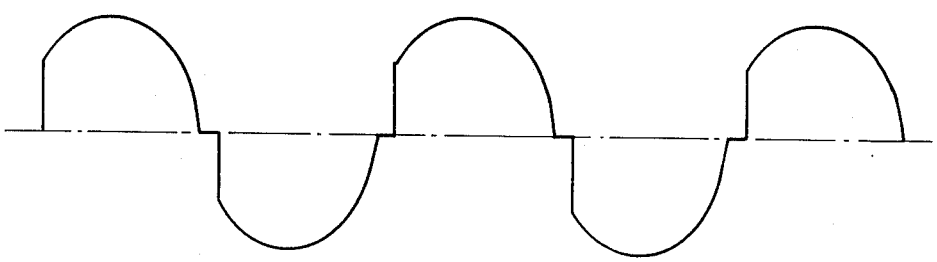
FIG. 4C
(SWITCH 52 &
54 OPEN)
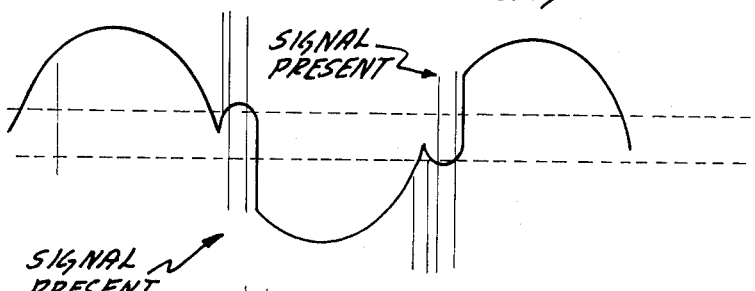
FIG. 4D
DIAGRAM
FIG. 4E
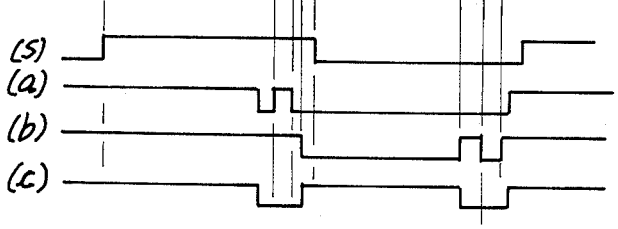
FIG. 4F

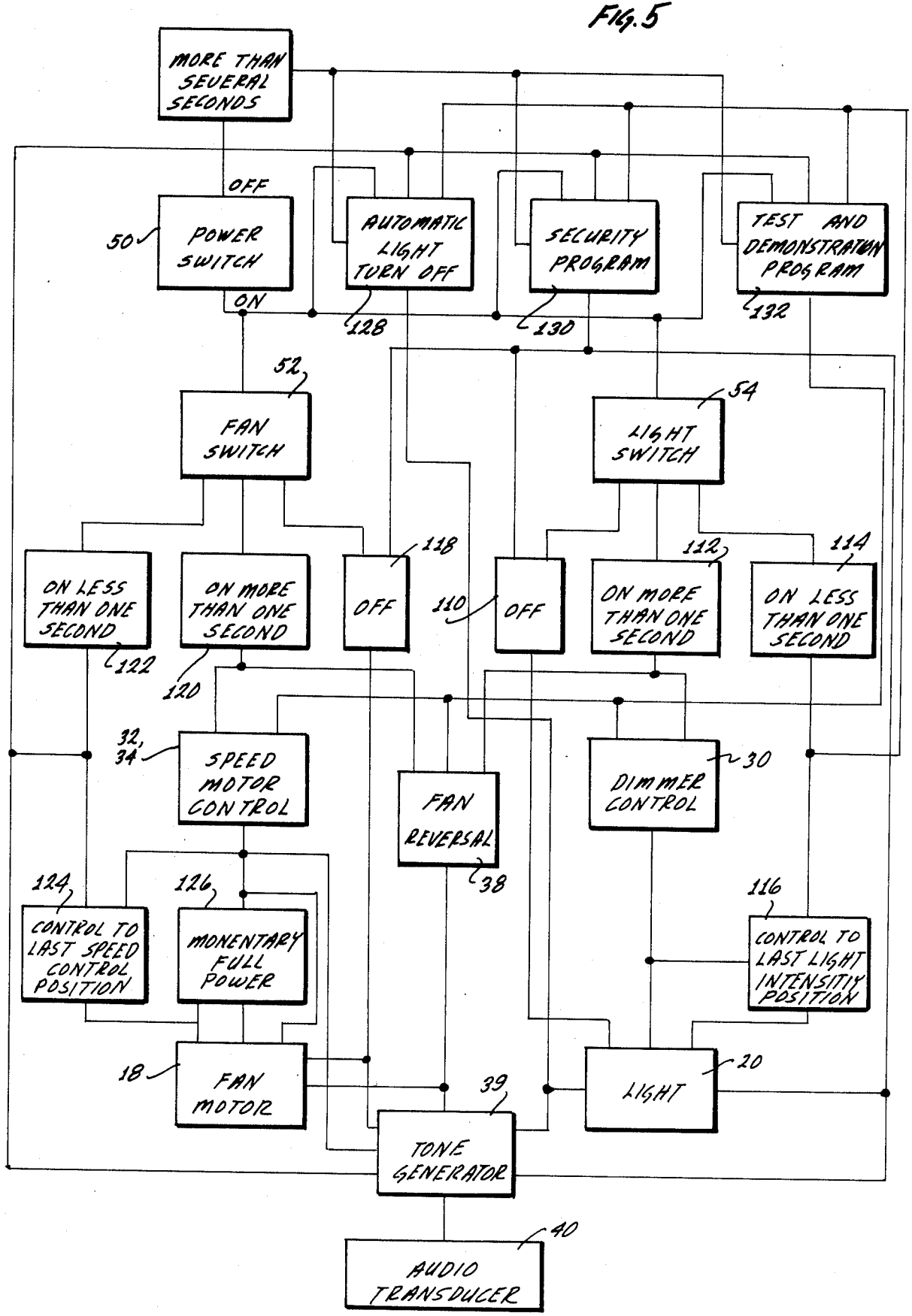

REMOTE CONTROL FOR COMBINED CEILING FAN AND LIGHT FIXTURE

BACKGROUND OF THE INVENTION

1. Field of the Invention

The present invention is directed to a remote control for a combined ceiling fan and light fixture. Specifically, the present invention is directed to a remote control wherein a wall control may be used as a replacement for an existing wall switch, and with a control unit providing for control of the ceiling fan and accompanying light fixture mounted to a ceiling fixture without any modification to the existing electrical wiring between the wall switch and the ceiling fixture.

2. Description of the Prior Art

Ceiling fans are currently manufactured which provide for a variety of desired features. Specifically, modern ceiling fans may generally be controlled to operate at at least a plurality of different speeds from a relatively low speed to a high maximum speed. In addition, the direction of rotation of the fan may generally be controlled to be in either one of two opposite directions.

Ceiling fans are also often combined with light fixtures and with the intensity level of the light fixtures additionally controlled from low light levels to high maximum light levels. Presently, most if not all of these various controls of the fan and/or combined light fixture are generally provided by controls located on the fan itself.

The fans themselves are generally mounted to an existing electrical ceiling fixture and may be used in place of a light fixture. The power to the fan, either individually or when combined with a light fixture, is provided by the normal on/off wall switch. Once power is switched to the fan then further controls such as on/off, speed control and the direction of rotation may be provided by controls located on the fan itself. Similarly, additional controls such as on/off and intensity of the light fixture combined with the fan are provided by controls located on the fan. The fan and light may be preset to the desired levels of speed and intensity and the existing wall switch used to turn the fan and light to these preset levels.

Unfortunately, each time the user desires to change the existing levels than a further control must be made at the fan. As an example, during the daytime it may be desirable to run the fan and not the light. Therefore, the light must be turned off at the fan. At night, it may be desirable to run the light and not the fan. At that time the fan must be turned off at the fan. There are times when the fan speed is to be increased, decreased or reversed or the intensity of the light level changed and again all of this additional control must be accomplished at the fan. If the fan is located a sufficient distance above the floor, it may be necessary to bring a chair or ladder in order for the user to accomplish this additional control.

It can be seen therefore that it would be very desirable to be able to control all the various functions of the combined fan and light from a convenient position remote from the fan. In the past this has generally been accomplished by rewiring between the existing wall switch and the ceiling fixture and replacing the wall switch with variable controls connected to the new wiring to provide for a control of any or all of the desired functions. Unfortunately, such a rewiring can not be accomplished by the average homeowner and this means that the fan must be installed by an electrician between the location of the wall switch and the location of the ceiling fixture. This greatly complicates the installation of the ceiling fan with a remote control and makes the installation considerably more expensive.

One prior art device which has been used to provide for a partial solution to the above described problem of remotely controlling the operation of the ceiling fan is shown in U.S. Pat. No. 4,322,632 issued Mar. 30, 1982 and listing Edward F. Hart and Dean D. Fletcher II as the inventors. This prior art patent is directed to a remote load selector which uses an existing wall switch to control a load by toggling the existing switch as to provide for the selective application of power to multiple loads such as a combined ceiling fan and light fixture. This prior art patent has a number of limitations and specifically the patent operates by the actual application or removal of power by manually operating the wall switch. This may be sometimes difficult to accomplish properly. In addition, the prior art load selector described above is generally limited in the number of controls that can be accomplished by the application and removal of power to the loads.

SUMMARY OF THE INVENTION

The present invention provides for a remote control, including a wall control, which may be used in substitution for the existing on/off wall switch to provide for a complete control of all the functions of a combined ceiling fan and light fixture. The wall control is substituted for the existing on/off wall switch without the provision of any additional wiring other than interconnecting the wall control to the existing wiring. A control unit is incorporated within the combined ceiling fan and light fixture, and with the control unit interconnected to the existing wiring at existing ceiling fixture when the fan is mounted to the ceiling fixture. The wall control may provide all of the following controls or any individual one or group of controls may be selected. Specifically, the wall control may include a main power switch to control all power to the ceiling fan and light fixture. A second switch may be included to control the light to be either on or off and also to vary the intensity of the light. A third switch may be included to control the fan to be either on or off and also to control the speed of the fan. The fan direction may be reversed by an operation of, for example, the light and fan switches simultaneously.

In order to provide for all of the above controls, the remote control system of the present invention includes a transmitter and a detector. The transmitter is formed as part of the wall control which is substituted for the existing on/off wall switch. The detector is formed as part of the control unit which is incorporated within the fan itself. The control unit additionally may include a microprocessor to provide for a control of the fan and light in accordance with signals received from the transmitter.

Since the remote control of the present invention includes a microprocessor as part of the control unit, this allows the remote control to also provide for other additional features which are highly desirable. These additional features are unique to the present invention and are desirable when compared with prior art devices. For example, the remote control of the present invention may include an automatic light turn off feature so that when the remote control is so programmed, the lights are automatically turned off after a preselected period of time. Additionally, the remote control may include a home security feature so that when the remote control is so programmed, the lights are automatically turned on and off in a selected predetermined order. This provides the appearance to an outside observer that the house is occupied even when this is not the case. Other features that may be incorporated with the remote control of the present invention are a test program and a demonstration program. This insures that the fan may be tested by the user to determine that all of the control features are properly operating. Additionally, a similar program or the same program may be used to provide for a selling demonstration of the combined fan and light fixture incorporating the remote control.

BRIEF DESCRIPTION OF THE DRAWINGS

A clearer understanding of the present invention will be had with reference to the following description and drawings wherein;

FIG. 2 is a schematic of a wall control including a transmitter forming a part of the remote control system of the present invention;

FIGS. 4A, 4B, 4C, 4D, 4E and 4F are wave forms illustrating the operation of the transmitting and detecting of the signals in the remote control of the present invention;

FIG. 5 is a flow chart explaining the operation and control provided by the microprocessor forming part of the remote control of the present invention; and FIG. 6 is a diagram illustrating the installation of the combined fan and light fixture incorporating the remote control of the present invention using existing house wiring.

DESCRIPTION OF THE PREFERRED EMBODIMENTS

Figure 1:
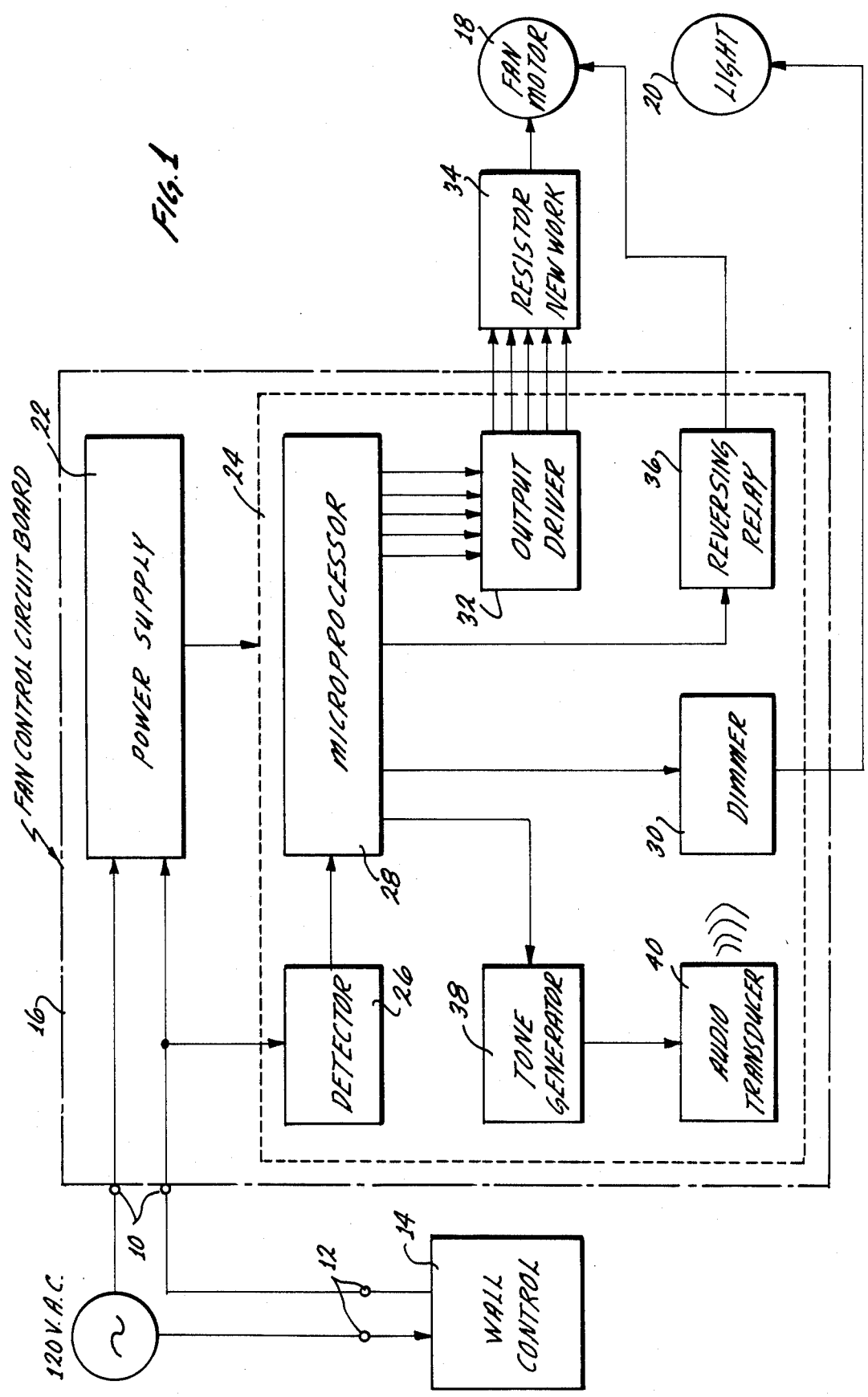
FIG. 1 is a block diagram of a remote control system constructed in accordance with the teachings of the present invention.

As shown in FIGS. 1 and 6, existing electrical power, such as 120 volts AC, is present in the existing wiring in a house. This electrical power is present at an existing ceiling fixture as shown by terminals 10 and with the power to the ceiling fixture controlled in accordance with a completion of the circuit in a terminal box in the wall as shown by terminals 12. Typically, the power in the terminal box in the wall is completed by a simple on/off wall switch so as to control the application of power at the ceiling fixture as represented by the terminals 10.

With the remote control of the present invention, the existing wall switch is removed and in its place a wall control 14 is electrically interconnected using the existing wiring. Preferably, the wall control 14 is designed to fit within the existing metal terminal box so that the wall control may be a simple replacement of the existing wall switch. The terminals 10 at the existing ceiling fixture are electrically interconnected to a control unit 16 forming part of the remote control and as represented by a single block in FIG. 1 and two blocks in FIG. 6.

The control unit 16 includes associated control elements to provide for power to a fan motor 18 and a light fixture 20 which are typically part of a combined ceiling and light fixture 102 as shown in FIG. 6. The remote control of the present invention uses the existing house wiring so that the combined fan and light fixture 102 are interconnected with the existing 120 volt AC power in exactly the same way as prior art devices which did not include remote control. However, in the present invention the control of the fan motor 18 and light 20 is provided by the wall control 14 so that the various functions may be provided remotely from the wall control and the controls at the fan may be eliminated. As shown in FIG. 6, the interconnection between the combined fan and light 102, the electrical power and the wall control is in a series arrangement to thereby eliminate any necessity for providing any special rewiring. Therefore, the combined ceiling fan with light fixture 102, including the remote control, may be installed by the customer without the need of an electrician.

The control unit 16 is typically positioned within the fan and light fixture itself and would include the following components as shown in FIG. 1. Specifically, the electrical power at the terminals 10 is directly connected to a power supply 22. The power supply 22 provides power to all of the components shown within the dotted block 24. The electrical power is also supplied directly to a detector 26 for detecting any control signals forming part of the AC current wave. Specifically, the wall control 14 provides for a phase firing delay control of the 120 volt AC current wave and the phase firing delay is detected by the detector 26 to provide for the particular control of the fan motor 18, light 20 and other associated portions of the remote control system.

The output from the detector 26 is applied to a microprocessor 28 and in turn the microprocessor provides for control of a plurality of other portions of the control unit 16 within the dotted block 24. Specifically, in order to control the intensity of the light 20 from a zero intensity to a maximum intensity, the microprocessor 28 controls a light dimmer 30 and with the output of this dimmer controlling the intensity of light from the light fixture 20. The microprocessor also provides for a plurality of output signals to an output driver 32. The output driver 32 provides for a plurality of output signals each representing a different fan speed. The output signals are passed through a resistor network 34 to provide for the control of the fan motor 18 from a zero speed to a maximum speed through a series of steps in accordance with the value of the individual resistor in the resistor network. The microprocessor 28 also provides for an output signal to a reversing relay 34 which in turn controls the direction of rotation of the fan motor 18.

In order to announce to the user that particular control functions have been accomplished, such as turning the fan on and off, controlling the speed of the fan motor 18 and reversing the fan, these controls provide an output signal from the microprocessor which is applied to a tone generator 38. The tone generator 38 drives an audio transducer 40 to produce an audible sound.

It can be seen therefore, that through the use of the microprocessor 28, the fan motor 18 and light fixture 20 may be varied in speed, direction and intensity in accordance with signals provided from the wall control 14 and with at least some of these controls announced through the use of a tone generator 38 driving an audio transducer 40. As will be further explained, the microprocessor may also be used to provide for other controls of the fan motor 18 and light fixture 20. For example, the microprocessor may provide for automatic light turn off program, a home security program and a test and demonstration program.

As shown in FIG. 2, the wall control 14 includes three (3) switches. Specifically, an on/off switch 50, a fan control switch 52 and a light control switch 54. The on/off switch 50 is a standard single pole double throw switch that is either in an on position or an off position. The switches 52 and 54 are preferably switches of the type that are normally closed but may be maintained open when pressure is applied by the user but which return to a closed position when released. These switches may be activated to be momentarily open or may be activated to be open for a longer period.

Across each switch 52 and 54 is a diode as shown by diodes 56 and 58. The diodes are used to steer the currrent flow depending upon which one of the switches 52 and 54 is open. As an example, if switch 52 is open, current flow through one half of the AC sine wave will be through the diode 56. However, current flow will be blocked through the combination of the switches 52 and 54 and diodes 56 and 58 in the other half of the sine wave. The reverse will happen when the switch 54 is activated to be open. Current through both halves of the sine wave will be blocked when both switches 52 and 54 are activated to be open.

When current through either of the halves of the sine wave is blocked, then this blocked half of the current must pass through a phase firing circuit. This circuit includes a triac 60, which has an integral triggering diac formed as part of its structure, and also a timing capacitor 62 and resistor 64. The capacitor 62 and resistor 64 are selected to have values so that there is a slight phase firing delay during a portion of the sine wave dependent upon which one or both of the switches 52 and 54 are actuated. The phase firing delays may be seen with reference to FIGS. 4A, 4B and 4C.

A signal such as shown in FIG. 4A is produced when switch 52 is open. A signal such as shown in FIG. 4B is produced when switch 54 is open and when both switches are open then a signal such as shown in FIG. 4C is produced. As can be seen from FIGS. 4A, 4B and 4C, the sine wave is delayed at a point after the zero crossing. Specifically, the phase firing delay circuit produces a signal represented by a reduction or elimination of the normal voltage which would appear in the area following the zero crossing.

The actuation of the switches 52 and 54 in the wall control therefore produce three (3) different switch operations affecting either the individual halves of the sine wave or both halves of the sine wave. These three (3) different signals are used to provide a control of the operation of the combined fan and lighting fixture. The wall control also includes an additional capacitor 66 and resistor 68 which together form a simple snubber circuit to eliminate transients from causing inadvertant operation of the triac 60.

One of the particularly important aspects of the remote control of the present invention is that the signalling mechanism provided by the wall control is accomplished directly on the powerline and in series with the detector and the two (2) loads of the fan motor and light as shown in FIG. 6. The signalling is accomplished with a signal on the line which is easily detected while at the same time the signalling reduce the power available to the loads by only a very small amount.

As can be seen by looking at the area under the curves as shown in FIGS. 4A, 4B and 4C, even though the phase firing may be as much as thirty degrees (30°), this only provides for a loss of power of less than five percent (5%). This is because the phase firing delay is provided at a point immediately following the zero crossing at which time the power is at a low point. In the actual operation of the remote control of the present invention, it is virtually impossible to observe any dimming of the lights during the signalling operation.

Figure 3:
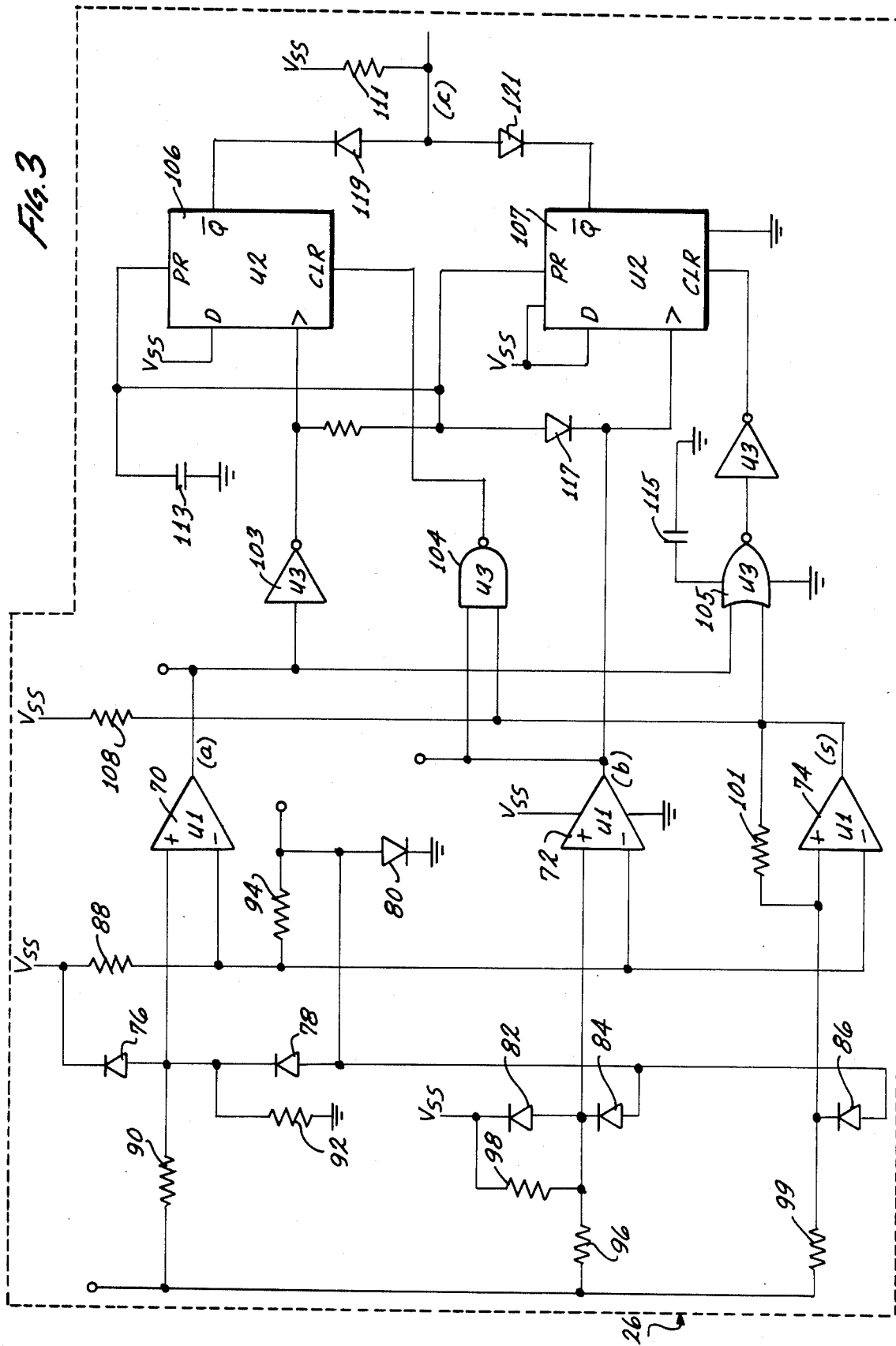
FIG. 3 is a schematic of a detector again forming the part of the remote control of the present invention.

As shown in FIG. 3, the signal detection circuitry 26 receives as an input the AC line signal which may include any of the signal states shown in FIGS. 4A, 4B and 4C. These signals are applied through input coupling circuits to three (3) voltages comparators 70, 72 and 74.

The input circuits include diodes 76, 78, 80, 82, 84 and 86, and resistors 88, 90, 92, 94, 96, 98, 99 and 101. The output from the comparators is passed through gates 103, 104 and 105 to flip flops 106 and 107. The input and output circuits for the gates and flip flops includes resistors 108, 109 and 111, capacitors 113 and 115 and diodes 117, 119 and 121.

As shown in FIG. 4D, the signals to the microprocessor 28 from the detector 26 are only sensed by the microprocessor 28 during a brief window period which starts approximately six hundred (600) microseconds after the zero crossing and ends eighteen hundred (1,800) microseconds after the zero crossing. Therefore, even though the detector 26 is providing a detection throughout the entire AC wave it is only signals from the detector during this window period which are effective to the microproessor.

The detector is constructed to sense a voltage above the threshold level and which signal travels in the same direction as the voltage above the threshold level immediately before the zero crossing. This detection occurs for both directions so as to detect signals at both half cycles of the AC wave. Actually, it is the absence of a voltage with these characteristics within the window period which is declared to be a signal and further in order for the signal to be valid, it must be present for at least ten (10) electrical cycles, which is one sixth (1/6) of a second, before the microprocessor recognizes this as a correct signal.

It can be seen therefore that when the AC signal is absent, a voltage with the above characteristics within the window period would represent any of the three (3) different signals as shown in FIGS. 4A, 4B and 4C. However, because of the back EMF of the motor, it is normally very difficult to produce a pure wave form as shown for example in FIG. 4D. Instead, when a signal is present, it typically produces a wave form having a double curve such as shown in FIG. 4E. Because the signal is not an ideal one but rather as present in FIG. 4E, the detector 26 provides a discrimination in accordance with the direction of the voltage during the window period as described above. The detector generally operates in the following manner:

The output signal (s) from the comparator 74 is a general sense signal and as shown in FIG. 4F, the (s) signal alternates high and low and with the point of change after the window period. Using the sense signal (s) to establish the particular half of the AC sine wave is being detected, the output signals (a) and (b) from the comparators 70 and 72 control the signal (c) to the microprocessor taken at the junction of the diodes 119 and 121. Specifically, when the signal (s) is high, the signal (c) goes low on the falling edge of the signal (a) and goes high on the falling edge of the signal (b). In addition, when the signal (s) is low, the signal (c) goes low on the rising edge of the signal (b) and goes high on the rising edge of the signal (a). The sense signal (s) is also suplied to the microprocessor so that the microprocessor can distinguish when the signal (c) represents the particular half of the AC sine wave.

The remaining portions of the remote control system, as shown in FIG. 1, may be formed with conventional components. For example, the dimmer 30 may be provided by a phase control to control the intensity of the light 20 by varying the firing angle on both sides of the AC wave form. The dimmer 30 may include a triac and the firing angle may be controlled by the microprocessor 28 to provide control signals to switch the triac on during each half cycle at particular points and thereby vary the intensity of the power output to drive the light 20.

The output driver 32 may be formed by a series of triacs and with these triacs driving the resistance network 34. The resistance network is formed by individual dropping resistors and with particular ones of the dropping resistors in series with the fan motor 18 in accordance with the control of particular ones of the triacs. The triacs forming the output driver 32 are individually controlled by signals from the microprocessor 28. Depending upon which of the dropping resistors is chosen, this controls the current and thereby the speed of the motor 18. The reversing relay 36 controls the direction of current flow through the motor. The reversing relay 36 is also controlled by signals from the microprocessor 28 to thereby control the direction of rotation of the fan motor 18.

Finally, when at least some of the various controls are accomplished, the microprocessor 28 provides for output signals to the tone generator 38 to thereby control the audio transducer to produce a distinctive audio signal. The particular audio tone signals may be individual to particular control functions as may be seen in more detail with reference to FIG. 5. As shown in FIG. 5, the power switch 50, fan switch 52 and light switch 54 provide the basic control to the fan motor 18 and light 20.

As shown in FIG. 6 and as described above, the switches 52, 54 and 56 are part of a wall control 14 having a cover plate 100 so that the wall control may be used as an replacement for an existing on/off wall switch. The wall control is interconnected to the terminal wires 12 which are already present in the conduit or terminal box which housed the original on/off wall switch. The combined ceiling fan and light fixture 102, which incorporate the fan motor 18 and light 20, is used in replacement of the existing ceiling fixture. In particular the combined fan and light fixture 102 is g electrically interconnected to the terminal wires 10 which are present in the conduit or terminal box in the ceiling.

As indicated above, the switch 50 may be a simple on/off switch while switches 52 and 54 may be normally closed switches which may be maintained either momentarily open or open for longer periods of time. All power to the fan motor and light is controlled to be either on or off by the power switch 50. The power switch 50 need be turned off only in initiating any of the programs or when the user desires to cut off all power to the system. In general however, the power switch is turned on and then all control to the light 20 and fan motor 18 is through the actuation of the fan switch 52 and light switch 54.

The light switch 54 provides for three (3) different modes of operation. If for example, the light 20 is already on, then momentarily operating the light switch turns the light off as shown by block 110 of FIG. 5. If the light 20 is off, then the light switch may be actuated for either more than one (1) second, as shown by block 12, or less than one (1) second, as shown by block 114. To vary the intensity of the light 20, the light switch is held on more than one (1) second so as to actuate the dimmer control 30. Specifically, the light 20 is controlled to turn on at a low intensity and gradually increase until the switch is released. The control of the light intensity is a function of the microprocessor 28 and the microprocessor will remember the last setting of the dimmer control. Therefore, the lights may be turned off and on at this remembered intensity level by operating the light switch 54 to the off position as shown by block 110 or by operating the light switch to the on position for less than one (1) second, as shown by block 114, to thereby control the light on at the last light intensity position, as shown by block 116.

The fan switch 52 provides for similar functions as described above but with the control of the fan motor 18. Specifically, if the fan is on, actuating the fan switch 52 momentarily provides the fan to be off as shown by block 118. If the fan motor 18 is off, then actuating the switch 52 for more than one (1) second, as shown by block 120, provides for a speed control. Specifically, the motor speed control, formed by the output driver 32 and the resistor network 34 as controlled by the microprocessor 28, provides for a speed progression upward through a plurality of individual steps which as shown in FIG. 1 are six (6) in number.

Each time the speed increases, this is indicated by an audio tone of increasing frequency. The audio tone is produced by the tone generator 38 which in turn produces the audio sound from the audio transducer 40. The speed control therefore may be operated by holding the fan switch 52 on and listening for the increasing audio tone until the desired tone, representing the desired speed, is heard. When the switch 52 is released, the fan then operates at the desired speed and the microprocessor 28 maintains a memory of this desired speed for the fan motor 18. When the fan is on, then momentary operation of the fan switch 52 turns the fan off as shown by block 118. Also if the fan is off, then momentary operation of the fan switch 52 for less than one (1) second, as shown by block 122, controls the fan to be turned on to the last speed control position, as shown by block 124.

When the fan is turned off, this is indicated by a two tone descending signal as provided by the tone generator 38. Operating the fan switch 52 to turn the fan on, at the preset speed, is indicated by a single tone signal from the tone generator 38. In order to ensure that the fan motor 18 is brought promptly up to a desired speed each time the fan is controlled on to either a preset speed or to increasing speeds, then momentary full power is applied to the fan motor, as shown by block 126, so as to have the fan quickly reach the desired speed.

The direction of air flow provided by the fan may be reversed by operating the light switch 54 and fan switch 52 simultaneously. The fan reversal is provided by the reversing relay 38 and when the fan direction is reversed, a four tone signal is provided by the tone generator 38. The microprocessor 28 maintains the direction of operation of the fan in the newly selected direction until this direction is again reversed by the user. The last chosen direction of fan rotation is maintained in memory by the microprocessor even if all power to the fan is turned off.

In addition to the on/off and intensity controls to the fan motor and light provided by the wall control 14, the remote control of the present invention may provide for additional desired programs. This is because the control of the fan motor and light is by the microprocessor 28 as shown in FIG. 1. As an example, three (3) additional programs may be provided. These programs are an automatic light turn off program shown by block 128, a security program shown by block 130 and a test and demonstration program shown by block 132. These particular programs have the following characteristics and may be initiated by a orderly sequence of operation of the fan switch 52 and light switch 54.

One wasteful use of energy in the home is the leaving on of lights. The automatic light turn off program provides for the light 20 to be automatically turned off two (2) hours after the last operation of the light switch 54. This particular program may be initiated as follows. First, the power switch is turned off for a period of time such as three (3) seconds and then the power is turned back on. The fan switch 52 and light switch is then operated in the sequence fan-fan-light-light within a particular time period, such as within a period less than several seconds. A sequence of tones from the tone generator 38 is then heard to indicate that the microprocessor 28 has now received and will provide the automatic light turn off program. Operation of the fan motor 18 and light 20 is now normal except for the addition of the automatic light turn off program. After a period of time, such as two (2) hours after the last operation of the light switch 54, the lights are automatically turned off. If it is desired to cancel this automatic light turn off program, the power switch is turned off for a period of time such as at least several seconds.

The security program, shown by block 130, is designed to control the lights 20 to produce a visual appearance that the house is occupied. Again, this program may be initiated by turning off the power switch 50 for more than several seconds, such as three (3) seconds, and then turning the power back on. The fan switch 52 and light switch 54 are then operated with the sequence light-fan-light-fan all within a particular period of time. Again the tone generator 38 produces a distinctive tone to indicate that the microprocessor has received and is providing the security program and additionally the lights are flashed on and off. The security program also discontinues the control of the fan motor 18 and lights 20 from the fan switch 52 and light switch 54 until the program is cancelled. When the lights are under the control of the security program, the lights are turned on and off in a controlled sequence so as to provide for a lived in look to any outside observer of the house. In order to cancel the security program, the power switch 50 is turned off for more than several seconds, such as more than three (3) seconds.

The microprocessor 28 may also provide for a test and demonstration program. This program allows the operation of the remote control to be demonstrated to the customer by sales personnel and also to allow the user to test the operation of the system after the combined fan and light fixture with the remote control is installed. Again, power is turned off for more than several seconds, such as three seconds, and then the power is turned on. The fan switch 52 and light switch 54 are then operated in the sequence fan-light-fan-light-fan all within a selected period of time such as several seconds. At that time a multi toned signal is provided by the tone generator 38 to announce the start of the test and demonstration routine. As an example, the following sequence may occur so as to test and demonstrate the entire sequence of operations.

1. Light slowly increases to full intensity.
2. Fan accelerates to a middle speed with increasing audio tones.
3. Light dims to half intensity.
4. Fan increases to full speed with increasing audio tones.
5. Fan reverses at full speed with audio tones.
6. Fan operates at full speed.
7. Fan reverses again with audio tones.
8. Fan slow quickly, then is turned off with audio tones.
9. Lights turn off.

A complete cycle as described above may last for approximately one (1) minute. The cycle then repeats continuously, but the program may be cancelled by merely turning the power switch 50 off for more than several seconds such as more than three (3) seconds.

It can be seen therefore, that the remote control device of the present invention, for use with a combined ceiling fan and light fixture, has a number of important advantages. Specifically, the remote control operates through the use of a transmission system which provides for a phase firing delay of the existing electrical power. The control provides complete remote control of all fan and light functions from the convenient existing wall location. The installation of the wall control is provided with no rewiring and the remote control operates on existing unmodified household lighting circuits. Also, although the present invention has been shown to operate on a typical single wiring circuit, it is to be appreciated that three way wiring circuits may also be used.

The wall mounted controller does not require any external power, such as batteries, since it operates on the existing power present in the lighting circuit. There are no exposed power cords or any hand held transmitters. Also, the system provides no interference with other remote control systems since it is only operating within the existing wiring between the wall switch and ceiling fixture.

The motor operation is provided over a plurality of preset speeds, such as six (6) different speeds, and once a speed is selected, this selection is memorized even when the fan is turned off. The light dimming is over a full range and again the light intensity is memorized when the lights are turned off. The air flow reversal of the fan is smooth and the air flow direction again is memorized when the fan is turned off. All of the various selected fan operations are announced by different audio tone sequences so that the user can easily recognize the particular selected fan operation.

Once the remote wall unit is installed, it is permanent and the remote wall unit not only controls the fan and light operations as described above, but all power may also be turned off at the wall position. Since complete control is provided from the wall position, no pull chains, switches or controls need be mounted on the fan itself. In addition to the above features, the remote control of the present invention also may include additional desired programs such as an automatic light turn off program, a security program and a test and demonstration program.

The remote control of the present invention therefore provides for significant, improved operation with high reliability, low cost and simple operation for the user.

Although the present invention has been described with reference to a particular embodiment it is to be appreciated that the various adaptations and modifications may be made and the invention is only to be limited by the appended claims.

I claim:

1. A remote control system for a combined ceiling fan and light fixture for use with existing AC current house wiring between a wall switch and a ceiling fixture including a wall control for electrical substitution of the wall switch in series with the AC current house wiring and with the wall control including at least two separate control members for producing separate signals at a particular area of the AC wave on the existing AC current house wiring representing a separate control for the speed of the fan and the light intensity of the light, a control unit mounted on and electrically interconnected with the combined ceiling fan and light fixture and with the control unit electrically connected in series with the AC current house wiring at the ceiling fixture when the combined ceiling fan and light fixture is mounted on the ceiling fixture, the control unit including means for detecting the separate signals on the existing AC current house wiring in accordance with the actuation of the separate control members at the wall control, and the control unit additionally including fan speed control means and light intensity control means each responsive to one of the detected separate signals to produce an individual control of the speed of the motor to a number of different speeds other than zero and the intensity of the light to a number of different light intensities other than zero in accordance with the individual actuation of the separate control members at the wall control.

2. The remote control system of claim 1 wherein the wall control additionally includes an on/off switch for controlling all power to the remote control system.

3. The remote control system of claim 1 wherein the two separate control members are switches having open and closed positions and normally biased to the closed position and with the switches actuated either momentarily open or open for longer periods of time to control the fan and light to be on or off in accordance with the switches momentarily open and to control the number of different speeds of the fan and the number of different intensities of the light in accordance with the switches open for longer periods of time.

4. The remote control system of claim 1 wherein each of the separate control members includes means to delay the AC wave a fixed time period at a particular area of the AC wave to produce a different fixed phase firing delay of the AC wave for each control member to produce the separate signals on the existing AC current house wiring.

5. The remote control system of claim 4 wherein the particular area for the phase firing delays occur just past the zero crossing for each half of the AC waves.

6. The remote control system of claim 1 wherein the control unit additionally includes a reversing means for reversing the direction of rotation of the fan and wherein actuation of both control members at the same time is detected by the detecting means to produce a reversing signal to control the reversing means to reverse the direction of rotation of the fan.

7. The remote control system of claim 1 wherein the fan speed control means provides for control of the number of different speeds of the motor in discrete steps and wherein the light intensity control means provides for control of the number of different intensities of the light in discrete steps.

8. The remote control system of claim 1 additionally including an audio tone generator responsive to the at least one of the control means to announce by audio tones the operating of the at least one control means.

9. The remote control system of claim 8 wherein the audio tone generator is responsive to the fan speed control means to announce by audio tones the control of the fan speed.

10. The remote control system of claim 8 wherein at least the control member representing the control of the fan speed is a switch having open and closed positions and normally biased to a closed position and with the switch actuated either momentarily open or open for longer periods of time to control the fan to be on or off in accordance with the switch momentarily open and to control the speed of the fan in accordance with the switch open for longer periods of time and with the on/off and speed control of the fan announced by audio tones from the tone generator.

11. The remote control system of claim 8 wherein the control unit additionally includes a reversing means for reversing the direction of rotation of the fan under control by the actuation of the separate control members and with the reversing of the direction of rotation of the fan announced by an audio tone from the tone generator.

12. The remote control system of claim 1 wherein the control unit includes a microprocessor to interrelate the detection of the separate signals with the control of the fan and light by the fan speed control means and the light intensity control means.

13. The remote control system of claim 12 wherein the microprocessor provides an automatic light turn off program to control the light off after a predetermined period of time after the last control of the light by the light control member.

14. The remote control system of claim 12 wherein the microprocessor provides a security program to control the light in a predetermined sequence of light on and light off.

15. The remote control system of claim 12 wherein the microprocessor provides a test and demonstration program to control the light and fan in a predetermined sequence of operation including on/off of fan and light, fan speed and light intensity and fan reversal.

16. A remote control system for controlling the operation of a combined ceiling fan and light fixture and using existing AC current house wiring located between a wall switch position and a ceiling fixture position including a wall control for mounting at the wall switch position and for electrical interconnection in series with the existing AC house wiring and with the wall control including at least two separate switches each producing a delay of the AC current a fixed time period at a particular area of the AC wave to provide a different fixed phase firing delay of the AC current for each switch to produce separate signals on the existing AC current house wiring representing a separate control for the speed of the fan and the light intensity of the light, a control unit mounted on and electrically interconnected with the combined ceiling fan and light fixture and with the control unit electrically interconnected in series with the existing AC current house wiring at the ceiling fixture position when the combined ceiling fan and light fixture is mounted at the ceiling fixture position, the control unit including a detector for sensing the separate signals on the existing AC current house wiring in accordance with the actuation of the separate switches in the wall control, the control unit additionally including fan speed control means and light intensity control means for producing an individual control of the speed of the motor to a number of different speeds other than zero and the intensity of the light to a number of different light intensities other than zero, and the control unit further including a microprocessor responsive to the detected separate signals and operatively coupled to the fan speed control means and the light intensity control means for fan speed control and light intensity control in accordance with the individual actuation of the separate switches at the wall control.

17. The remote control system of claim 16 wherein the wall control additionally includes an on/off switch for controlling all power to the remote control system and provide a reset for the microprocessor.

18. The remote control system of claim 16 wherein the two switches each have open and closed positions and are normally biased to the closed position and with the switches actuated either momentarily open or open for longer periods of time so that the microprocessor provides operation of the fan and light control means to control the fan and light to be on or off in accordance with the switches momentarily open and to control the number of different speeds of the fan and the number of different intensities of the light in accordance with the switches open for longer periods of time.

19. The remote control system of claim 18 additionally including an audio tone generator controlled by the microprocessor to provide different audio tones in accordance with the fan turned on, off and speed varied.

20. The remote control system of claim 16 wherein the particular area for the phase firing delays occur just past the zero crossing for each half of the AC wave.

21. The remote control system of claim 16 wherein the control unit additionally includes a reversing means for reversing the direction of rotation of the fan and wherein the microprocessor is responsive to the detection of the actuation of both switches at the same time to control the reversing means to reverse the direction of rotation of the fan.

22. The remote control system of claim 21 additionally including an audio tone generator controlled by the microprocessor to provide an audio tone in accordance with the reversal of direction of rotation of the fan.

23. The remote control system of claim 16 wherein the fan speed control means is operated by the microprocessor to provide for control of the number of different speeds of the motor in discrete steps and wherein the light intensity control means is operated by the microprocessor to provide for control of the number of different intensities of the light in discrete steps.

24. The remote control system of claim 23 additionally including an audio tone generator controlled by the microprocessor to provide audio tones in accordance with each discrete step in speed of the fan.

25. The remote control system of claim 16 wherein the microprocessor provides an automatic light turn off program to control the light off after a predetermined period of time after the last control of the light by the light control member.

26. The remote control system of claim 16 wherein the microprocessor provides a security program to control the light in a predetermined sequence of light on and light off.

27. The remote control system of claim 16 wherein the microprocessor provides a test and demonstration program to control the light and fan in a predetermined sequence of operation including on/off of fan and light, fan speed and light intensity and fan reversal.

* * * * *